United States Patent
Martin (10) Patent No.: US 10,072,913 B2
(45) Date of Patent: Sep. 11, 2018

(54) ARROW FLETCHING SYSTEM AND METHOD

(71) Applicant: Brian Martin, Crossett, AR (US)

(72) Inventor: Brian Martin, Crossett, AR (US)

(*) Notice: Subject to any disclaimer, the term of this patent is extended or adjusted under 35 U.S.C. 154(b) by 322 days.

(21) Appl. No.: 14/860,930

(22) Filed: Sep. 22, 2015

(65) Prior Publication Data

US 2016/0084620 A1 Mar. 24, 2016

Related U.S. Application Data

(60) Provisional application No. 62/071,332, filed on Sep. 22, 2014, provisional application No. 62/130,215, filed on Mar. 9, 2015.

(51) Int. Cl.

| | |
|---|---|
| *F42B 6/06* | (2006.01) |
| *B29C 65/00* | (2006.01) |
| *B29C 65/50* | (2006.01) |
| *B29C 53/04* | (2006.01) |
| *B29C 53/40* | (2006.01) |

(52) U.S. Cl.
CPC .............. *F42B 6/06* (2013.01); *B29C 53/04* (2013.01); *B29C 65/50* (2013.01); *B29C 65/5057* (2013.01); *B29C 66/5326* (2013.01); *B29C 53/40* (2013.01); *Y10T 156/103* (2015.01); *Y10T 156/1033* (2015.01)

(58) Field of Classification Search
None
See application file for complete search history.

(56) References Cited

U.S. PATENT DOCUMENTS

| | | | | |
|---|---|---|---|---|
| 1,748,200 | A * | 2/1930 | Barnhart | F42B 6/06 |
| | | | | 473/586 |
| 4,927,478 | A * | 5/1990 | Erickson | F41B 5/1446 |
| | | | | 156/185 |
| 2016/0010960 | A1* | 1/2016 | Castruita | F42B 6/06 |
| | | | | 473/586 |

* cited by examiner

*Primary Examiner* — Barbara J Musser (57) ABSTRACT

A system and method for arrow fletching by bonding vanes to a vinyl wrap allows for efficient, accurate fletching of arrows. The vanes are placed into a number of slits positioned on a jig plate. The jig plate in a holder is placed into a heat press, thereby bonding the vanes to the vinyl wrapping and creating a fletched arrow wrap. Once the fletched arrow wraps are cooled they are placed in a fletching jig, with an adhesive coating on the backside of the wrap exposed by removing a paper backing. The shaft of each arrow is rolled over the adhesive coating such that the wrap becomes affixed to the shaft of the arrow, thereby fletching the shaft.

19 Claims, 7 Drawing Sheets

ARROW FLETCHING SYSTEM AND METHOD

CROSS-REFERENCE TO RELATED APPLICATIONS

This application claims the benefit of U.S. Provisional Patent Application No. 62/071,332, filed on Sep. 22, 2014, and entitled ""Field Fletching Device," and U.S. Provisional Patent Application No. 62/130,215, filed on Mar. 9, 2015, and entitled "Arrow Fletching Apparatus and Method." Such applications are incorporated herein by reference in their entirety.

BACKGROUND OF THE INVENTION

The present invention is directed to a system and method for fletching arrows. Fletching is the aerodynamic stabilization of arrows using a number of "fletches" which resembles fins, which may commonly be referred to as the feathers of an arrow. In fact, the original method for fletching arrows for accurate arrow flight was the application of feathers to the shaft of the arrow in order to give the arrow a more accurate flight pattern. Today, flexible polymer materials are preferred for the vanes that form the fletching on an arrow shaft. Regardless of the material used, however, the process of fletching arrows is complicated and tedious, requiring a certain level of skill on the part of the fletcher to create an arrow that flies true. In addition, the fletching vanes that are attached to the arrows often times wear out or become detached due to repetitive use, requiring re-fletching. It is desired to have a method for fletching arrows that allows the user of the arrow to quickly and easily re-fletch the arrows, such as in the event the fletching vanes become detached during use in the field. It is further desirable to have a simple, efficient method by which arrows may be quickly fletched or re-fletched, even by a person who is not expertly trained in the art of fletching arrows.

BRIEF SUMMARY OF THE INVENTION

The present invention is directed to a system and method for fletching arrows. The present invention allows uses a pre-cut, pre-measured set of arrow vanes to attach to a plastic wrap to be attached to the arrow shaft. The use of the wrap allows for the precise placement of fletching vanes with little expertise required of the operator. It is an object of the present invention to provide the user with a device and method for fletching or re-fletching arrows quickly and easily.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
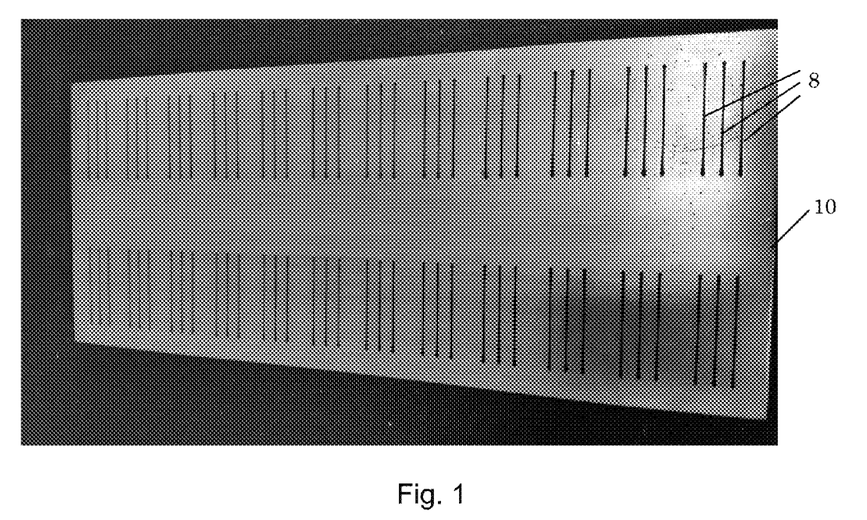
FIG. 1 is a drawing of the jig plate according to an embodiment of the present invention.

In general, certain embodiments of the invention are directed to a process for more efficiently and accurately providing fletching to an arrow, without requiring great expertise by the operator, as well as to an arrow fletched according to this method. The process for fletching an arrow according to an embodiment will be described with reference to FIGS. 1-12. Turning first to FIG. 1, a jig plate 10 is depicted. While desirably made of aluminum or other metal, any sufficiently rigid and strong material may be used for jig plate 10. In addition, jig plate 10 must be capable of withstanding heat during the pressing step, as explained below. Jig plate 10 has a number of jig plate slits 8 that are sized to receive vanes 14 (described below). In the illustrated embodiment, the arrows to be fletched will each have three vanes, and this jig plate 10 allows for the production of fletching for 24 arrows simultaneously. In alternative embodiments, arrows with a different number of vanes 14 per arrow could be used. Also in alternative embodiments, a different number of slits 8 to produce a different number of arrow fletchings could be used. A greater number allows the fletcher to produce more fletched arrows in a shorter period of time, but requires a larger press. The jig plate slits 8 of a particular jig plate 10 are spaced to correspond to the correct spacing of vanes 14 on various arrow shaft circumferences. Any number of jig plates 10 could be made to correspond to a variety of arrow circumferences. A proper jig plate 10 with a circumference corresponding to the arrow shaft being fletched must, however, be selected. The majority of arrow shafts are of a single common diameter, but the present invention is capable of accommodating any diameter shaft in various embodiments.

Figure 2:
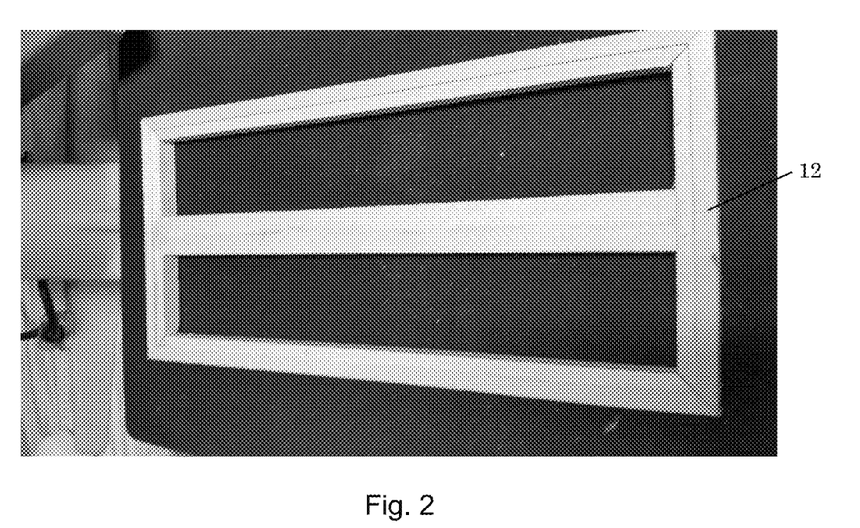
FIG. 2 is a drawing of a jig plate frame according to an embodiment of the present invention.
Figure 3:
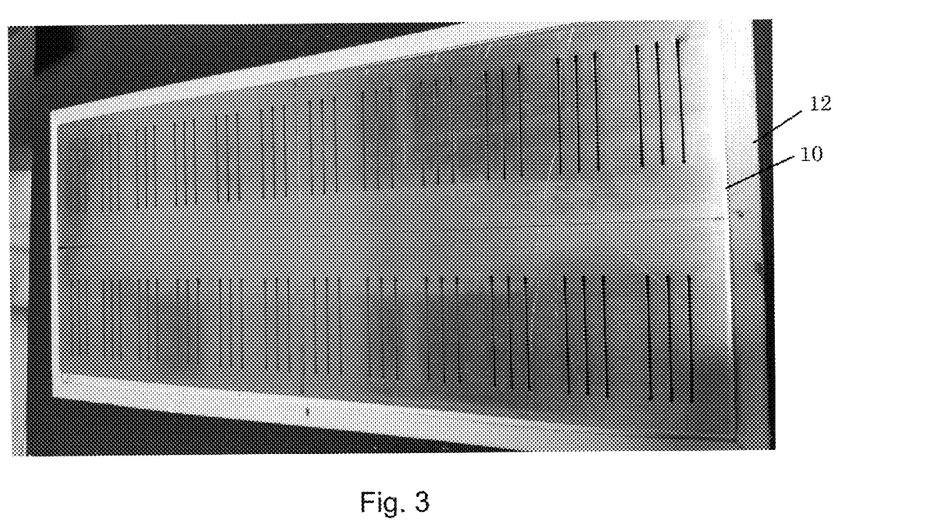
FIG. 3 is a drawing of the jig plate positioned in the jig plate frame according to an embodiment of the present invention.
Figure 4:
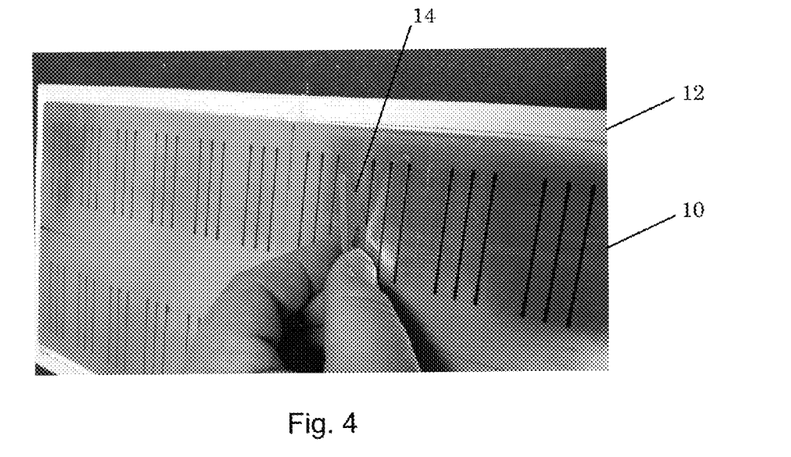
FIG. 4 is an illustration of a fletching vane being placed into the jig plate according to an embodiment of the present invention.
Figure 5:
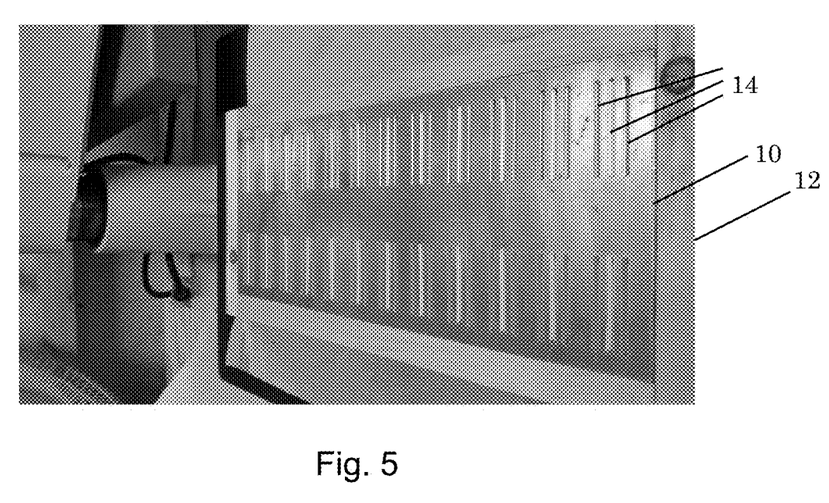
FIG. 5 is an illustration of all fletching vanes placed into the jig plate according to an embodiment of the present invention.
Figure 6:
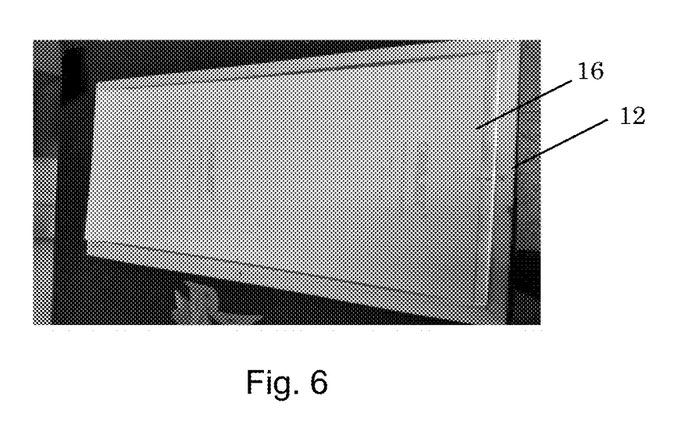
FIG. 6 is an illustration of the wrap sheet placed into position over the fletching vanes after their placement in the jig plate according to an embodiment of the present invention.

Once the proper jig plate 10 corresponding to the desired arrow shaft circumference is selected, the jig plate 10 is installed into jig plate holder 12. Jig plate holder 12 is illustrated in FIG. 2, and shown with jig plate 10 in place upon jig plate holder 12 in FIG. 3. Jig plate holder 12 serves to keep jig plate 10 stationary while vanes 14 are being attached to wrap sheet 16, as will be explained more fully below. In one embodiment, vanes 14 are premade and precut so that they can be bonded to the high-density plastic segments on wrap sheet 16 on the smooth side of wrap sheet 18, which will be exposed when applied to the arrow shaft. In one embodiment, each of the precut, pre-sized wraps on arrow wrap sheet 18 are made of a durable plastic material that has an adhesive coating on the back of it with a detachable thin wrap sheet backing 22, as illustrated and described below. FIG. 4 depicts a vane 14 being inserted into one of the slits 8 of jig plate 10 in jig plate frame 12, and FIG. 5 depicts the completed process showing all of slits 8 being fitted with vanes 12 in order to provide fletching for 24 arrows. The vanes 14 are installed in the jig plate 10 by inserting the thin parts of the vanes 14 into the slits 8 on the jig plate 10. The vanes 14 are inserted with the surface to be bonded to the arrow wraps 18 facing upward and the curved part of vanes 14 inserted through the jig plate 10. The vanes 14 are inserted such that one of the inserted vanes is a substitute for the traditional "cock" feather, which is at a right angle to the "nock" of the arrow, normally nocked so that it will not contact the bow when the arrow is shot.

Wrap sheet 16 with the pre-cut, vinyl or other plastic wraps 18 is aligned on the jig plate 10 using alignment and registration marks on jig plate 10 or jig plate holder 12 so that they are placed at the appropriate places on the jig plate. Wrap sheet 16 is shown in place on jig plate 10 in FIG. 6. The alignment and registration marks allow for precise placement of the fletching on each arrow without requiring an expert fletcher to be involved.

Figure 7:
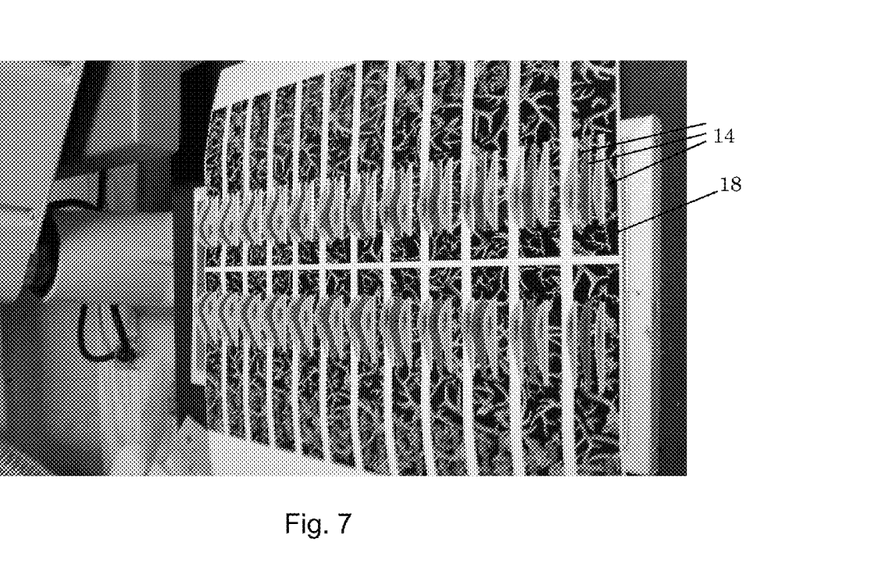
FIG. 7 is an illustration of the wrap sheet turned upright showing individual wraps and attached fletching vanes according to an embodiment of the present invention.

Once the vanes 14 are inserted and the wrap sheet 16 is aligned on jig plate 10, a heat press is used to facilitate the bonding of the plastic material of each vane 14 to the corresponding arrow wrap on wrap sheet 16. In a typical application, three vanes 14 are bonded to each wrap 18 on wrap sheet 16. In one embodiment using vinyl vanes 14, it is desired that the heat press be preheated to 260 to 270 degrees Fahrenheit in order to get proper bonding. Furthermore, the heat press should be equipped with a timer set to 10 seconds. Using the heat press to bond the plastic to the arrow wrap for more than 10 seconds may cause excessive melting and could break down the material. Too little time in the heat press, however, will result in one or more of the vanes 14 not being properly attached to the corresponding wrap 18. The pressure on the press is set to the desired amount of downward pressure, which is controlled by the pressure exerted on the heat press. The heat press is clamped for approximately ten seconds and then released. Once the press is released, the newly fletched vinyl wraps 18 may be removed from the jig press 10 for cooling, as shown in FIG. 7. The vanes 14 are now attached to the arrow wraps 18 by bonding such that no glue or additional adhesive is needed, because the arrow wraps 18 have an adhesive coating on their back, as explained following. The vanes 14 will each be extending perpendicularly at a right angle to the wrap 18 to which they are bonded. The exposed surface of wraps 18 may be camouflaged for hunting arrows, or colored as desired to the needs or preference of the user.

Figure 8:
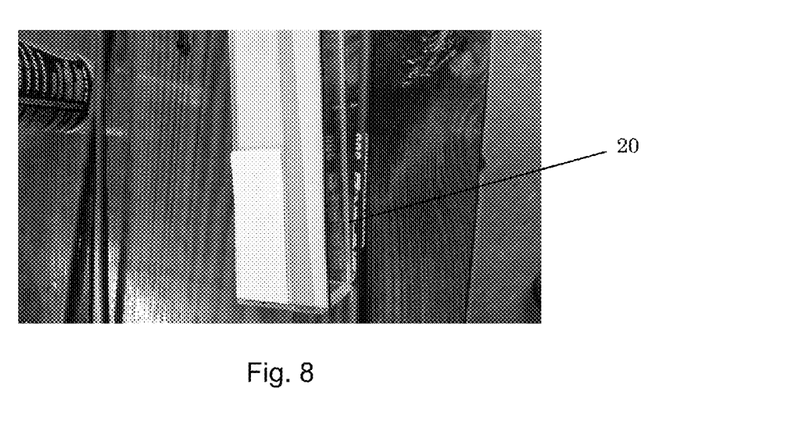
FIG. 8 is an illustration of a fletching jig according to a preferred embodiment of the invention.
Figure 9:
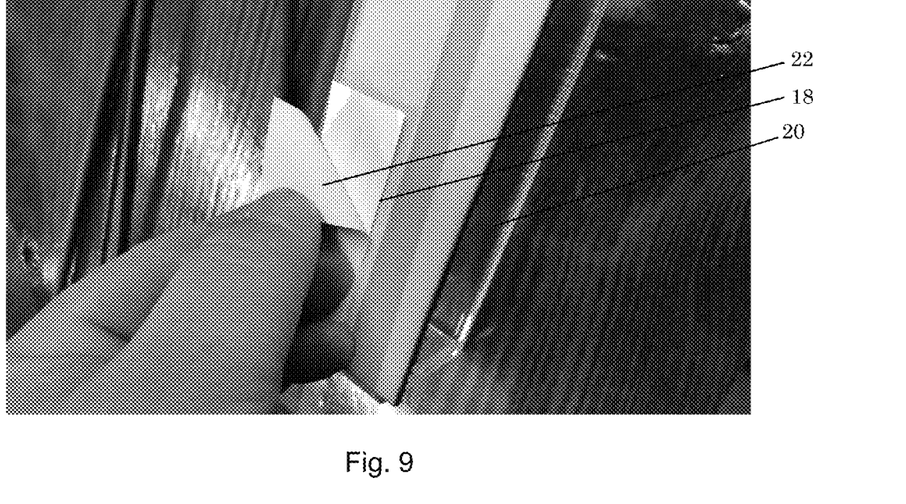
FIG. 9 is an illustration of a wrap positioned in the fletching jig with the wrap backing being removed according to a preferred embodiment of the present invention.
Figure 10:
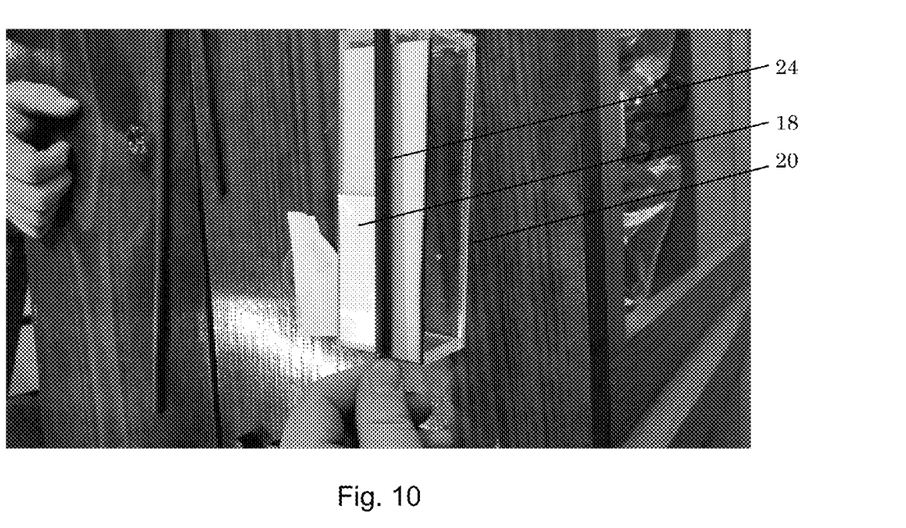
FIG. 10 is an illustration of an arrow shaft placed into the fletching jig and ready for application of fletching according to an embodiment of the present invention.
Figure 11:
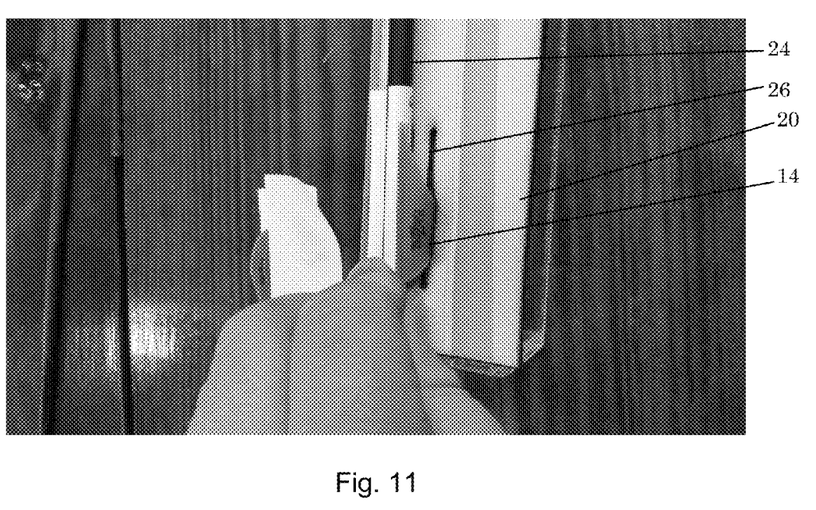
FIG. 11 is an illustration of a first step in the process of fletching being applied to an arrow shaft according to an embodiment of the present invention.
Figure 12:
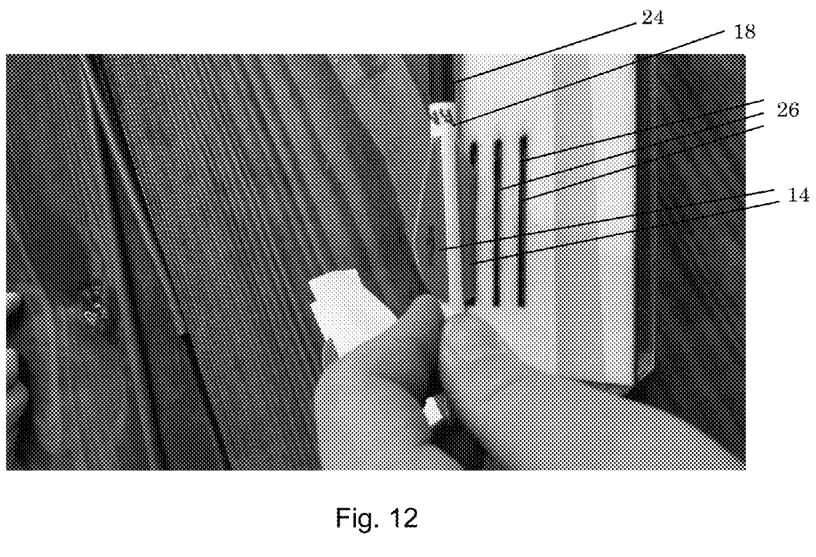
FIG. 12 is an illustration of a second step in the process of fletching being applied to an arrow shaft according to an embodiment of the present invention.
Figure 13:
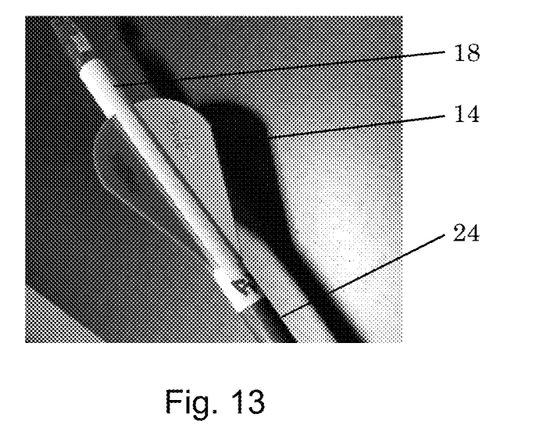
FIG. 13 is an illustration of a completed arrow shaft with straight fletching vanes according to an embodiment of the present invention.
Figure 14:
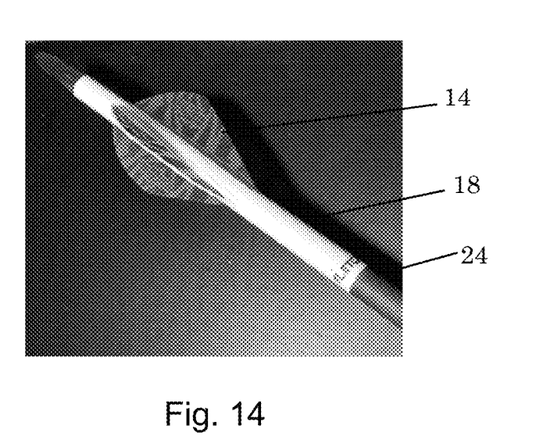
FIG. 14 is an illustration of a completed arrow shaft with helical fletching vanes according to an embodiment of the present invention.

Once the bonding has occurred, the fletched vinyl wrap may be placed into a fletching jig 20, as shown in FIG. 8. The fletching jig 20 is a box with four sides, with each side precisely measured and fitted together to allow the application of a wrap 18 to an arrow shaft 24 by simply rolling the arrow shaft over the exposed adhesive on the back side of a wrap 18, resulting in a precisely fletched arrow. The top of fletching jig 20 has a number of fletching jig slots 26 (see FIGS. 11 and 12) that are spaced so as to match the desired arrow shaft for this particular application. Multiple fletching jigs 20 may be used for arrows having shafts 24 of different diameters. The box may be made of a high-density molded plastic. The arrow vanes 14 are slid down into fletching jig slots 26 in the fletching jig 20 with the back side of the arrow wrap 18 facing upward. The wrap backing 22 (which may be made of paper or like material) may then be removed from the arrow wrap 18 to expose an adhesive surface, such that the wrap 18 may be applied to arrow shaft 24. To apply the wrap 18 to the arrow shaft 24, the arrow shaft 24 is placed at a desired angle for a helical or straight application of the vanes 14. The fletching jig 20 may be designed so as to facilitate the proper alignment of shaft 24 for this purpose, as illustrated in FIG. 8. Once the wrap backing 22 is removed from arrow rap 18 as shown in FIG. 9, arrow shaft 24 is rolled across the arrow wrap 18 until the wrap 18 is completely around the arrow shaft 24 with the fletching attached. Applying downward pressure to the arrow shaft 24 while rolling it over the vinyl arrow wrap 18 allows the wrap 18 to attach securely to the shaft 24. Applying the wrap 18 at a different angle using the fletching jig 20 allows the vanes 24 to attach to the shaft 24 in a helical fashion, with an angle as desired by the fletcher. Applying adequate pressure while attaching the wrap 18 is desired to eliminate bubbles. This process of rolling shaft 24 across wrap 18 is depicted in sequence in FIGS. 10-12. The result of this process is a precisely fletched arrow, without the necessity of great expertise or technical training on the part of the fletcher. FIG. 13 illustrates an arrow fletched according to this method with straight vanes (i.e., vanes 24 that lie in a flat plane extending outwardly from the axis of the shaft 24), while FIG. 14 illustrates an arrow fletched with helical vanes (i.e., vanes 24 that form a spiral shape extending outwardly from the axis of the shaft 24).

Unless otherwise stated, all technical and scientific terms used herein have the same meaning as commonly understood by one of ordinary skill in the art to which this invention belongs. Although any systems and materials similar or equivalent to those described herein can also be used in the practice or testing of the present invention, a limited number of the exemplary systems and materials are described herein. It will be apparent to those skilled in the art that many more modifications are possible without departing from the inventive concepts herein. All terms used herein should be interpreted in the broadest possible manner consistent with the context. Any ranges expressed herein are intended to include all particular values within the stated range, as well as all sub-ranges that fall within the stated range.

The invention claimed is:

1. An arrow fletching system for a plurality of arrows, each arrow comprising a shaft, wherein said arrow fletching system comprises:

a. a jig plate comprising a plurality of slit groups, each slit group comprising a plurality of slits each sized to receive an arrow vane;

b. a wrap sheet fittable over the jig plate, wherein the wrap sheet comprises a plurality of wraps attached at a first side of the wrap sheet in contact with the jig plate when a plurality of vanes are fitted within each of the slits of the plurality of slit groups, wherein each of the plurality of wraps are aligned with the vanes fitted into each of the plurality of slit groups;

c. a heat press sized to receive the jig plate and wrap sheet to adhere the vanes aligned with each of the wraps to the wraps;

d. a fletching jig comprising a plurality of slots sized to receive a wrap with a plurality of arrow vanes heat bonded to the wrap wherein the vanes attached to the wrap are fitted into the plurality of slots, wherein each wrap comprises a removable backing to expose an adhesive surface, and wherein rolling of the arrow shaft across the adhesive surface of the wrap causes the wrap and thus the vanes to be adhered to the arrow shaft.

2. The arrow fletching system of claim 1, further comprising a jig plate holder to receive the jig plate and sized to fit within the heat press.

3. The arrow fletching system of claim 1, wherein the jig plate comprises a flat metal sheet.

4. The system of claim 1, wherein the plurality of arrow vanes are pre-cut from a polymer material.

5. The system of claim 1, wherein the wrap sheet comprises a durable plastic material.

6. The system of claim 1, wherein the removable backing of each of the plurality of wraps comprises paper.

7. The system of claim 1, wherein the heat press is configured to be heated to an internal temperature in the range of 260 to 270 degrees Fahrenheit.

8. The system of claim 1, wherein the heat press further comprises a timer.

9. The system of claim 2, wherein one or more of the jig plate, the jig plate holder, or said wrap sheet comprises alignment marks, thereby allowing the wrap sheet to be properly aligned on the jig plate.

10. A method for fletching a plurality of arrows each comprising a shaft, wherein said method comprises the steps of:

a. inserting a jig plate into a jig plate holder;
b. preheating a heat press to a desired temperature;
c. setting a timer integral to the heat press to a desired duration;
d. setting a pressure of the heat press to a desired downward pressure;
e. inserting a plurality of arrow vanes into a plurality of slits of the jig plate;
f. aligning a wrap sheet on the press jig plate, wherein the wrap sheet comprises a first side and a second side, further wherein the wrap sheet is aligned such that the second side of the wrap sheet is facing upward and the first side of the arrow wrap sheet is in contact with the jig plate, and wherein a plurality of wraps on the first side of the wrap sheet are in alignment with the plurality of slits holding the plurality of arrow vanes;
g. inserting the jig plate holder into the heat press;
h. pressing said heat press downward for the desired duration, thereby bonding the plurality of arrow vanes to the wraps on the first side of the arrow wrap sheet, thereby creating a plurality of fletched arrow wraps;
i. releasing the heat press, thereby exposing the jig plate and jig plate holder;
j. removing the jig plate holder from the heat press, thereby allowing the plurality of fletched arrow wraps to cool;
k. inserting one of the plurality of fletched arrow wraps into a fletching jig comprising slots, wherein the vanes of such one of the plurality of fletched arrow wraps is inserted into the slits of the fletching jig;
l. removing a backing on the fletched arrow wrap in the fletching jig to expose an adhesive surface on the fletched arrow rap;
m. placing the shaft of one of the plurality of arrows on the adhesive surface on the fletched arrow rap in the fletching jig at a desired angle; and
n. rolling such shaft of one of the plurality of arrows across the adhesive surface on the fletched arrow rap in the fletching jig, thereby affixing such fletched arrow wrap to such shaft.

11. The method of claim 10, further comprising the step of selecting a jig plate from among a plurality of jig plates based on a diameter of the plurality of arrow shafts.

12. The method of claim 10, wherein the jig plate is a flat metal sheet.

13. The method of claim 10, wherein the desired temperature is in the range of 260 to 270 degrees Fahrenheit.

14. The method of claim 10, wherein the desired duration is 10 seconds.

15. The method of claim 10, wherein the plurality of arrow vanes comprise a thin side and a curved side, and wherein the thin side of the plurality of arrow vanes are inserted into the plurality of slits of the jig plate.

16. The method of claim 10, wherein at least one of the wrap sheet, the jig plate, and the jig plate holder further comprises alignment markings, and further comprising the step of aligning the alignment markings in order to properly align each of the plurality of wraps on the wrap sheet with the vanes in the slits in the jig plate.

17. The method of claim 10, wherein the backing sheet further comprises a paper backing attached to the second side of the wrap sheet, and wherein the paper backing is removable, thereby exposing the adhesive surface of the plurality of wraps attached to the wrap sheet.

18. The method of claim 10, wherein the desired angle corresponds to a helical fletching.

19. The method of claim 10, wherein the desired angle corresponds to a straight fletching.

* * * * *